US012785276B2

(12) United States Patent
Maeng et al.

(10) Patent No.: US 12,785,276 B2
(45) Date of Patent: Nov. 3, 2026

(54) ANTENNA PATTERN MANUFACTURING METHOD AND ANTENNA PATTERN MANUFACTURED THEREBY

(71) Applicant: AMOTECH CO., LTD., Incheon (KR)

(72) Inventors: Jooseung Maeng, Incheon (KR); Jinwon Noh, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 95 days.

(21) Appl. No.: 18/879,382

(22) PCT Filed: Jun. 22, 2023

(86) PCT No.: PCT/KR2023/008688
§ 371 (c)(1),
(2) Date: Dec. 27, 2024

(87) PCT Pub. No.: WO2024/005449
PCT Pub. Date: Jan. 4, 2024

(65) Prior Publication Data
US 2025/0392046 A1 Dec. 25, 2025

(30) Foreign Application Priority Data
Jun. 28, 2022 (KR) ........................ 10-2022-0078583

(51) Int. Cl.
*H01Q 7/00* (2006.01)
*H01Q 1/38* (2006.01)

(52) U.S. Cl.
CPC ................. *H01Q 7/00* (2013.01); *H01Q 1/38* (2013.01)

(58) Field of Classification Search
USPC ........................................................ 343/866
See application file for complete search history.

(56) References Cited

U.S. PATENT DOCUMENTS 6,717,067 B2 * 4/2004 Shi ...................... H05K 3/4038 174/262
7,205,483 B2 * 4/2007 Yamashita ........... G03G 15/225 174/262
(Continued)

FOREIGN PATENT DOCUMENTS

KR 10-2004-0003514 A 1/2004
KR 20040003514 A * 1/2004 ............... H01Q 7/00
(Continued)

OTHER PUBLICATIONS

KR Office Action dated Jun. 10, 2024 as received in Application No. 10-2022-0078583.

*Primary Examiner* — Alexander H Taningco
*Assistant Examiner* — Brandon Sean Woods
(74) *Attorney, Agent, or Firm* — Maschoff Brennan

(57) ABSTRACT

The present disclosure relates to an antenna pattern in a loop shape, which is mounted in a mobile terminal, etc., and used for wireless power transmission/reception or communication, and to a manufacturing method therefor, which enables the precise formation of the line spacing (or line width) of an antenna pattern by preparing a laminated substrate having metal layers formed on both surfaces of a base substrate and forming half grooves in the first and second surfaces of the laminated substrate, respectively, through double half-etching, wherein the half grooves at least partially overlap to construct a through hole forming a line spacing (or line width) of an antenna pattern.

11 Claims, 9 Drawing Sheets

(56) References Cited

U.S. PATENT DOCUMENTS

| | | | | | |
|---|---|---|---|---|---|
| 9,564,685 | B2 * | 2/2017 | Nago | H01Q 1/36 | |
| 10,581,146 | B2 * | 3/2020 | Lavin | H01Q 5/40 | |
| 11,495,887 | B2 * | 11/2022 | Mallegol | H01Q 9/27 | |
| 12,512,591 | B1 * | 12/2025 | Samson | H01Q 1/38 | |
| 2001/0042637 | A1 * | 11/2001 | Hirose | B23K 26/389 | 174/255 |
| 2016/0181695 | A1 * | 6/2016 | Mukherjee | H01Q 1/2216 | 343/866 |
| 2020/0203839 | A1 * | 6/2020 | Karhade | H01Q 9/0414 | |
| 2023/0124499 | A1 * | 4/2023 | Nikles | H01F 27/361 | 343/866 |

FOREIGN PATENT DOCUMENTS

| | | | | |
|---|---|---|---|---|
| KR | 10-1218755 | B1 | 1/2013 | |
| KR | 10-1317897 | B1 | 10/2013 | |
| KR | 10-2014-0132229 | A | 11/2014 | |
| KR | 10-2015-0077843 | A | 7/2015 | |
| KR | 20150077843 | A * | 7/2015 | H10W 20/056 |
| KR | 10-2276977 | B1 | 7/2021 | |

* cited by examiner

[FIG. 1]
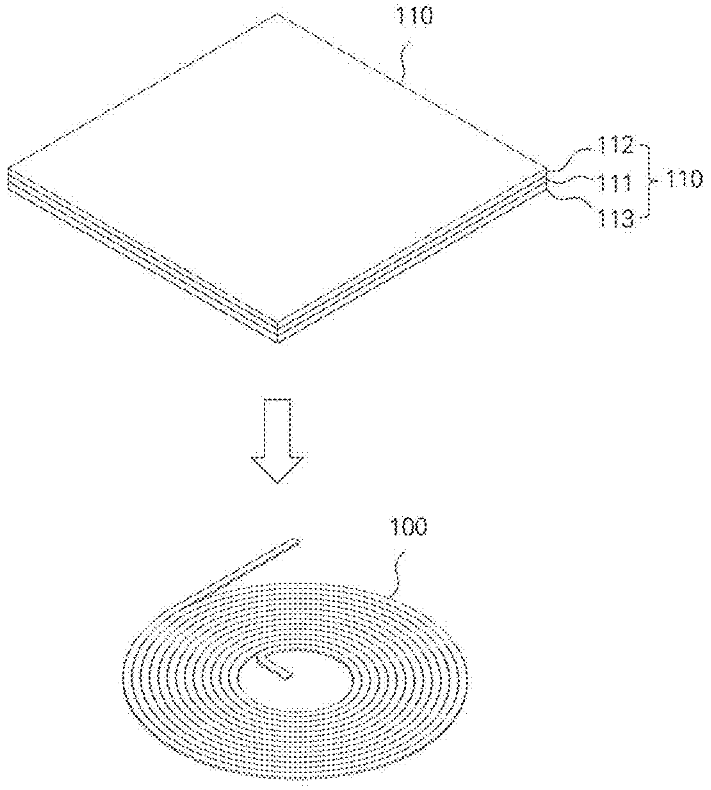

[FIG. 2]
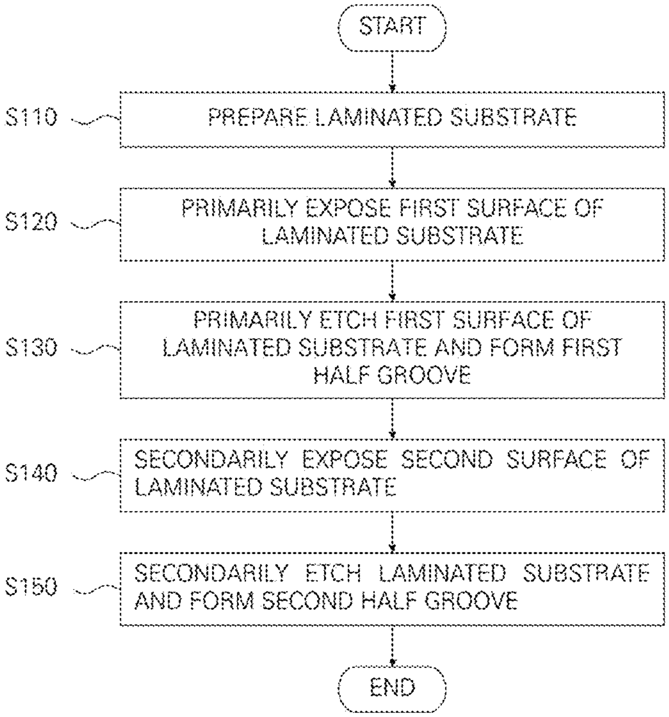

[FIG. 3]
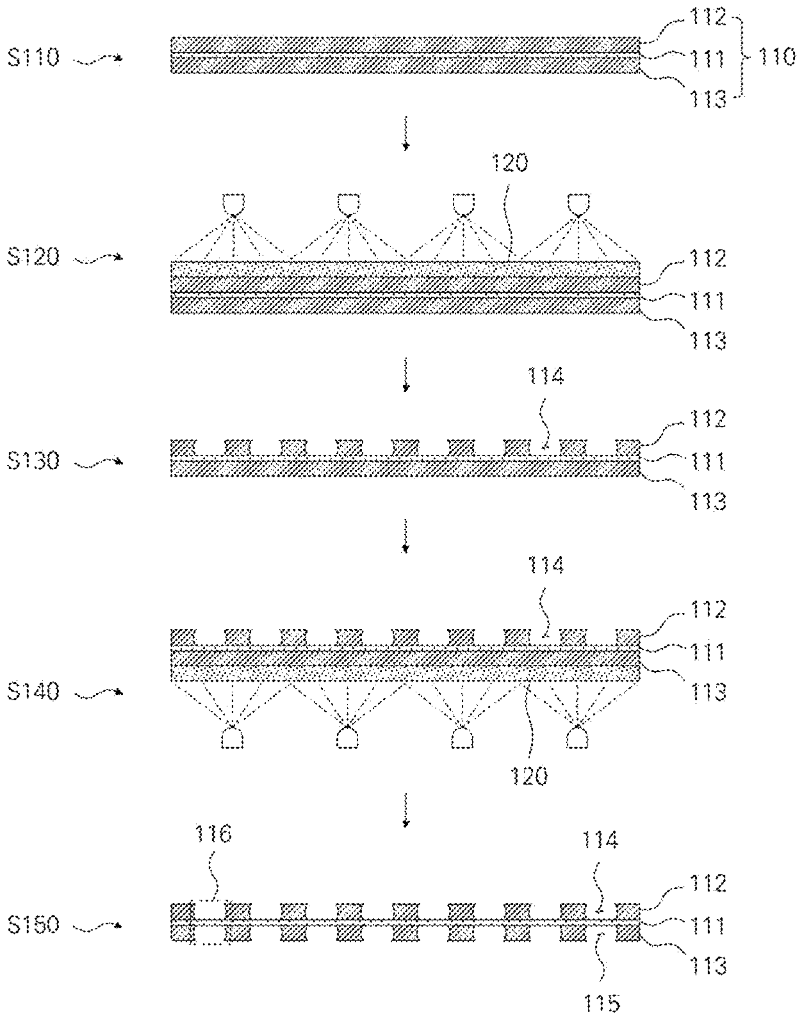

[FIG. 4]
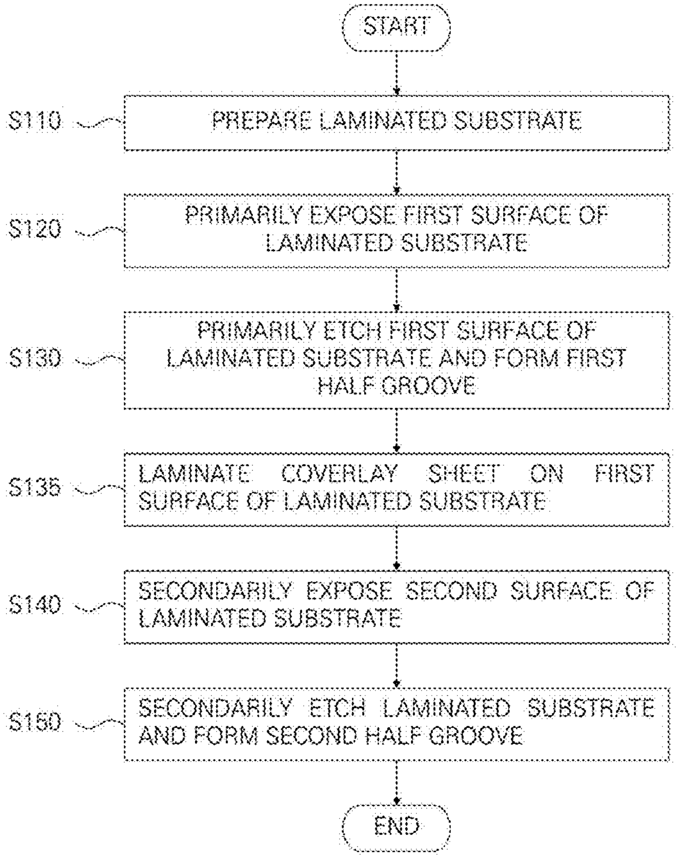

[FIG. 5]
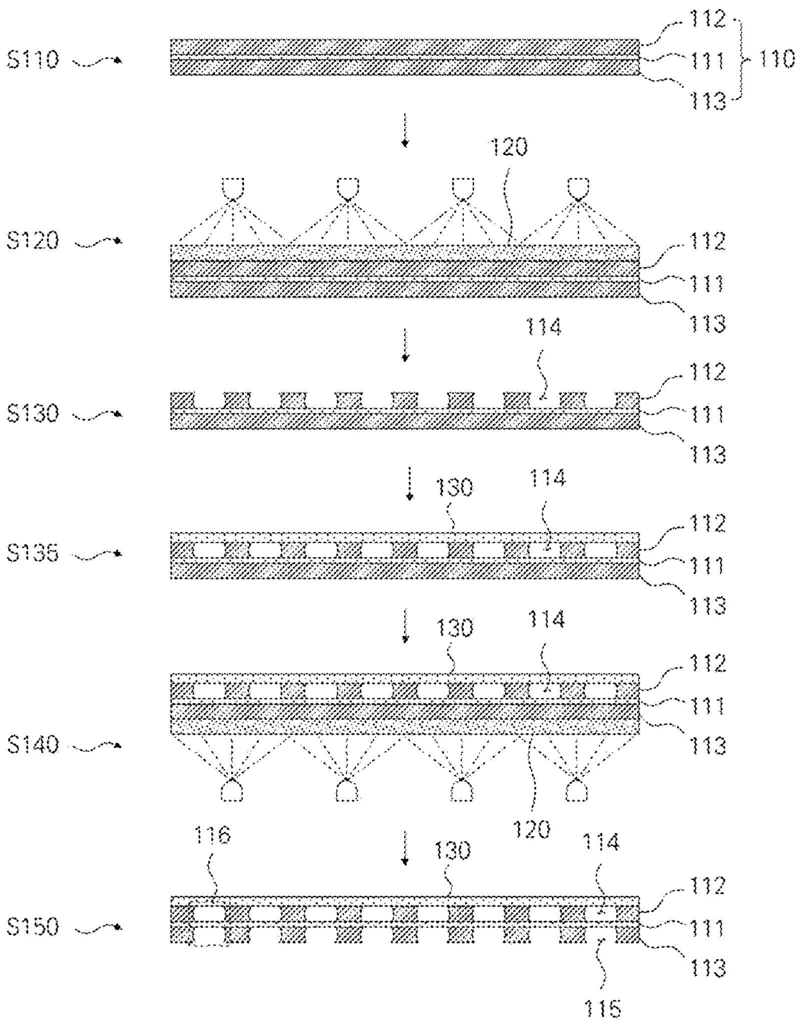

[FIG. 6]
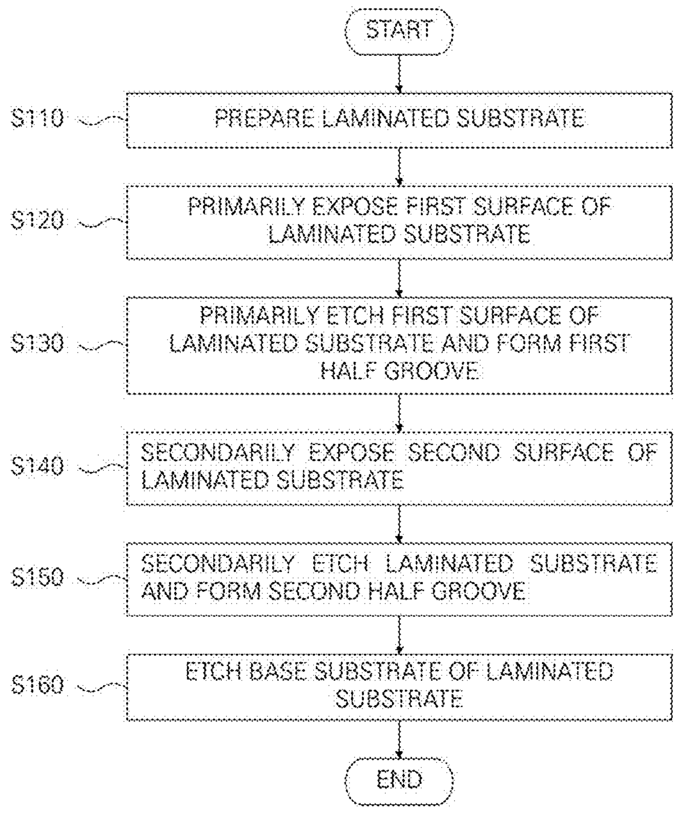
[FIG. 7]
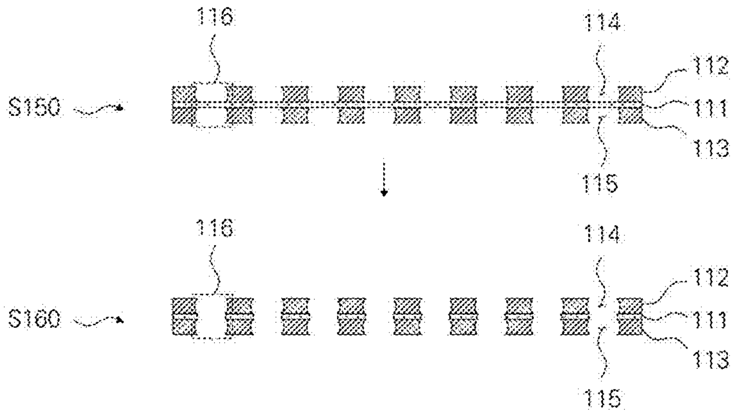

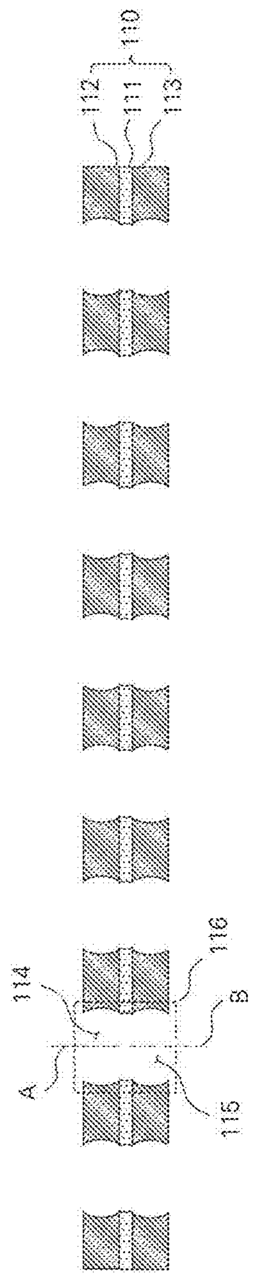
[FIG. 8]

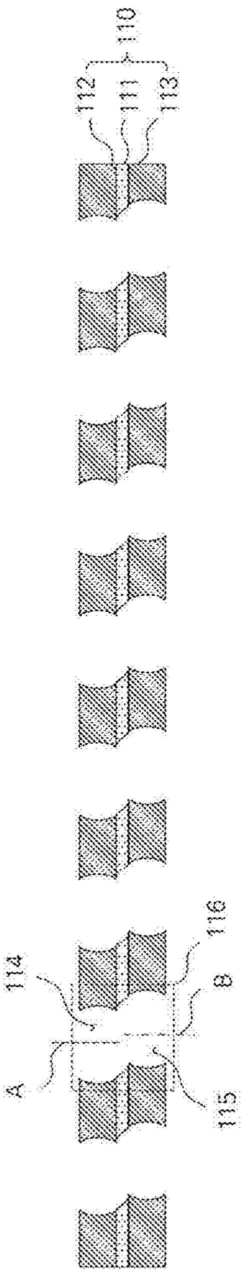
[FIG. 9]

[FIG. 10]
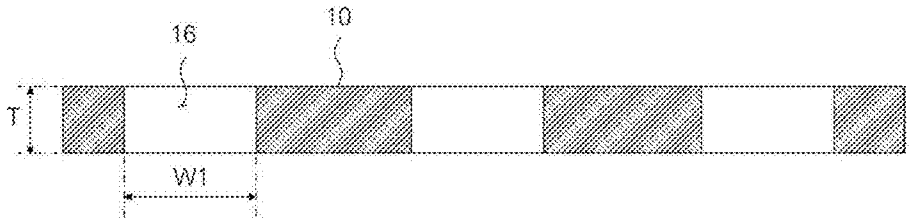
[FIG. 11]
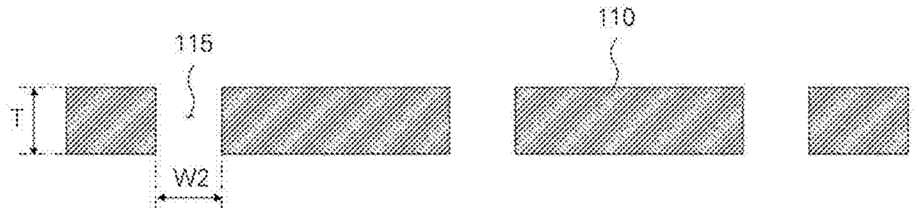

ANTENNA PATTERN MANUFACTURING METHOD AND ANTENNA PATTERN MANUFACTURED THEREBY

TECHNICAL FIELD

The present disclosure relates to an antenna pattern manufacturing method and an antenna pattern manufactured thereby, and more specifically, to an antenna pattern with a loop shape mounted on a mobile terminal or the like and used for wireless power transmission/reception or communication, and a method of manufacturing the same.

BACKGROUND ART

Recently, the market demand for high-power wireless charging of 20 W or higher for high-speed charging is increasing. The high-power wireless charging may have reduced charging efficiency or, in severe cases, cause a fire because a high voltage is applied to a wireless power transmission/reception antenna and a substrate in comparison to general charging methods.

Accordingly, in the high-power wireless charging market, the importance of heat generation suppression as well as wireless charging efficiency is increasing, and the thickness of an antenna is increasing for charging efficiency and heat generation suppression.

A coil winding method, a pattern printing method, and a hybrid method are mainly used as a method of manufacturing a wireless power transmission/reception antenna.

However, conventional manufacturing methods cannot precisely form a line spacing (or a line width) of a pattern when the thickness of the antenna increases. Accordingly, antennas manufactured by the conventional manufacturing methods have a problem that heat generation can be suppressed but charging efficiency is lowered.

The matters described above in the background art are intended to help understanding of the background of the disclosure and may include matters not related to the known related art.

SUMMARY OF INVENTION

Technical Problem

The present disclosure has been proposed to solve the above problem and is directed to providing an antenna pattern manufacturing method of preparing a laminated substrate on which metal layers are formed on both surfaces of a base substrate and forming a half groove in each of a first surface and a second surface of the laminated substrate through a double etching process to precisely form a line spacing (or a line width) of an antenna pattern.

Solution to Problem

To achieve the above object, an antenna pattern manufacturing method according to an embodiment of the present disclosure includes preparing a base substrate, and a laminated substrate having a first metal layer disposed on a first surface of the base substrate and a second metal layer disposed on a second surface of the base substrate, exposing the first surface of the laminated substrate, half-etching the first surface of the laminated substrate and forming a first half groove recessed from the first metal layer to the base substrate, exposing the second surface of the laminated substrate, and half-etching the second surface of the laminated substrate and forming a second half groove recessed from the second metal layer to the base substrate.

The forming of the second half groove may include forming the second half groove so that at least a part thereof overlaps the first half groove. In this case, the first half groove and the second half groove may form a through hole passing through the laminated substrate, and the base substrate may be disposed in the through hole.

The through hole forms a line spacing of the antenna pattern, and the line spacing of the antenna pattern may be 80% or more and 120% or less of a thickness of the laminated substrate.

The first half groove formed in the forming of the first half groove may have a first center axis that vertically passes through the first surface and the second surface of the laminated substrate, the second half groove formed in the forming of the second half groove may have a second center axis that vertically passes through the first surface and the second surface of the laminated substrate, and the first center axis and the second center axis may be spaced apart from each other.

The first half groove formed in the forming of the first half groove may have a first center axis that vertically passes through the first surface and the second surface of the laminated substrate, the second half groove formed in the forming of the second half groove may have a second center axis that vertically passes through the first surface and the second surface of the laminated substrate, and the first center axis and the second center axis may be disposed colinearly.

The antenna pattern manufacturing method may further include etching the base substrate disposed between the first half groove and the second half groove after the forming of the second half groove.

To achieve the above object, an antenna pattern according to an embodiment of the present disclosure is an antenna pattern in a loop shape, wherein a vertical cross section of the antenna pattern includes a plurality of metal patterns, and a through hole interposed between adjacent two patterns and formed to form a line spacing of the antenna pattern, and the metal pattern includes a base substrate, a first metal layer disposed on a first surface of the base substrate, and a second metal layer disposed on a second surface of the base substrate.

The through hole may include a first half groove formed by etching the first metal layer, and a second half groove formed by etching the second metal layer, and the first half groove and the second half groove may at least partially overlap each other to form the through hole that vertically passes through the antenna pattern. The through hole may further include the base substrate interposed between the first half groove and the second half groove.

A center axis of the first half groove and a center axis of the second half groove may be disposed colinearly, and the through hole may have one of an “8” shape and a “B” shape that vertically passes through the antenna pattern.

A center axis of the first half groove and a center axis of the second half groove may be disposed in parallel, and the through hole may have one of a tilted “8” shape and a tilted “B” shape that diagonally passes through the antenna pattern.

A width of the through hole may be 80% or more and 120% or less of a thickness of the antenna pattern.

Advantageous Effects of Invention

According to the present disclosure, the antenna pattern manufacturing method can be performed by dividing the etching process into two stages, thereby reducing the width of the through hole formed in the laminated substrate to about 50% in comparison to the conventional antenna pattern manufacturing methods.

In addition, since the antenna pattern manufacturing method can reduce the line spacing (or the line width) of the antenna pattern to 50% in comparison to the conventional methods, the antenna pattern having the line spacing (pitch) of 100 μm or less even can be manufactured on the laminated substrate having the thickness of 3 oz (105 μm).

In addition, the antenna pattern manufacturing method can manufacture the antenna pattern having the line spacing of about 80% to 120% of the metal thickness, thereby increasing the degree of freedom of design and enabling the performance optimization design.

In addition, the antenna pattern manufacturing method can manufacture the antenna pattern using the laminated substrate in which the base substrate is interposed between two metal layers, thereby simplifying the manufacturing process and preventing the deformation of the laminated substrate even when the laminated substrate moves or flips to manufacture the antenna pattern.

BRIEF DESCRIPTION OF DRAWINGS

FIG. 1 is a view for describing an antenna pattern manufacturing method according to an embodiment of the present disclosure.

FIG. 2 is a flowchart for describing the antenna pattern manufacturing method according to the embodiment of the present disclosure.

FIG. 3 is a view for describing each operation of the antenna pattern manufacturing method according to the embodiment of the present disclosure.

FIGS. 4 and 5 are views for describing a modified example of the antenna pattern manufacturing method according to the embodiment of the present disclosure.

FIGS. 6 and 7 are views for describing another modified example of the antenna pattern manufacturing method according to the embodiment of the present disclosure.

FIGS. 8 and 9 are views for describing a through hole formed in a laminated substrate through a first half groove forming operation and a second half groove forming operation.

FIGS. 10 and 11 are views for describing a comparison between a conventional antenna pattern manufacturing method and the antenna pattern manufacturing method of the present disclosure.

DESCRIPTION OF EMBODIMENTS

Hereinafter, exemplary embodiments according to the present disclosure will be described in detail with reference to the accompanying drawings.

The embodiments are provided to more completely describe the present disclosure to those skilled in the art, and the following embodiments may be modified in various different forms, and the scope of the present disclosure is limited to the following embodiments. Rather, the embodiments are provided to make the disclosure more faithful and complete and fully convey the spirit of the present disclosure.

Terms used herein are intended to describe specific embodiments and are not intended to limit the present disclosure. In addition, in the present specification, singular forms may include plural forms unless the context clearly indicates otherwise.

In the description of the embodiment, when each layer (film), area, pattern, or structure is described as being formed "on" or "under" a substrate, each layer (film), area, pad, or patterns, "on" and "under" include both cases of being formed "directly" or "indirectly with other elements interposed therebetween." In addition, in principle, the reference for "above" or "under" each layer are based on the drawing.

The drawings are only intended to help understanding of the spirit of the present disclosure and should not be construed as limiting the scope of the present disclosure by the drawings. In addition, in the drawings, a relative thickness and length, or a relative size may be illustrated in an exaggeration manner for the sake of convenience and clarity of description.

Referring to FIG. 1, an antenna pattern manufacturing method according to an embodiment of the present disclosure manufactures a loop-shaped antenna pattern 100 using a laminated substrate 110. The antenna pattern 100 manufactured through the antenna pattern manufacturing method can be used as the antenna pattern 100 for wireless power transmission/reception (wireless power consortium (WPC)), the antenna pattern 100 for near field communication (NFC), the antenna pattern 100 for electronic payment (magnetic secure transmission (MST)), etc.

The antenna pattern manufacturing method according to the embodiment of the present disclosure may be used to manufacture the combo antenna pattern 100 including two or more of the WPC, the NFC, and the MST.

In addition, one or more antenna patterns 100 manufactured by the antenna pattern manufacturing method according to the embodiment of the present disclosure may be assembled on a circuit board (flexible printed circuit board (FPCB)) to configure a single antenna or a combo antenna. In this case, the antenna pattern 100 may be assembled to the circuit board through a soldering process, an ultrasonic fusing process, etc.

In this case, at least one antenna pattern 100 among the NFC antenna pattern 100 and the MST antenna pattern 100, and terminal parts for connecting the antenna patterns 100 to an external board (e.g., a main board of a mobile terminal) may be formed on the circuit board, the WPC antenna pattern 100 manufactured by the antenna pattern manufacturing method according to the embodiment of the present disclosure may be assembled to the circuit board through the soldering process, the ultrasonic fusing process, etc., and a shielding sheet, a heat-dissipation sheet, etc. may be assembled, thereby configuring a combo antenna.

Referring to FIGS. 2 and 3, the antenna pattern manufacturing method according to the embodiment of the present disclosure includes a laminated substrate preparing operation S110, a primary exposing operation S120, a first half groove forming operation S130, a secondary exposing operation S140, and a second half groove forming operation S150.

The laminated substrate preparing operation S110 includes preparing the laminated substrate 110 in which metal layers are laminated on both surfaces of a substrate. In this case, the laminated substrate 110 includes a base substrate 111, a first metal layer 112 disposed on a first surface of the base substrate 111, and a second metal layer 113 disposed on a second surface of the base substrate 111 and, for example, has a thickness of about 2 oz (i.e., about 70 μm) or more. Here, the first metal layer 112 and the second metal layer 113 are, for example, made of a copper (Cu) material used as the antenna pattern 100.

The primary exposing operation S120 includes exposing the first surface of the laminated substrate 110. That is, the primary exposing operation S120 includes exposing the first metal layer 112 disposed on the first surface of the base substrate 111.

The primary exposing operation S120 includes forming an exposure layer 120 on the first surface of the laminated substrate 110. That is, in the primary exposing operation S120, a photoresist film is laminated on the first surface of the laminated substrate 110 to form the exposure layer 120 on the surface of the first metal layer 112. In the primary exposing operation S120, a photoresist may be applied on the first surface of the laminated substrate 110 to form the exposure layer 120 on the surface of the first metal layer 112.

In the primary exposing operation S120, UV light is radiated onto the first surface of the laminated substrate 110 through the exposure device in a state in which an antenna pattern 100 mask is laminated (or disposed) on the first surface of the laminated substrate 110 on which the exposure layer 120 is formed. Accordingly, the exposure layer 120 formed on the first surface of the laminated substrate 110 is cured to the same shape as the antenna pattern 100 of the antenna pattern 100 mask.

The first half groove forming operation S130 includes forming the first half groove 114 in the laminated substrate 110 by etching the first surface of the laminated substrate subjected to the primary exposing operation.

The first half groove forming operation S130 includes forming the first half groove 114 in the laminated substrate 110 by etching the first surface of the laminated substrate.

The first half groove forming operation S130 includes etching the first metal layer 112 on which the exposure layer 120 is formed. The first half groove forming operation S130 includes etching the first metal layer 112 through the etching process such as wet etching or dry etching.

Accordingly, the first half groove 114 recessed from the surface of the first metal layer 112 to the base substrate 111 is formed in the laminated substrate 110. Here, the first half groove 114 may be formed to be recessed from the surface of the first metal layer 112 to the surface of the base substrate 111, and the surface of the base substrate 111 may be exposed through the first half groove 114.

The first half groove forming operation S130 includes removing the cured exposure layer 120 after forming the first half groove 114.

The secondary exposing operation S140 includes exposing the second surface of the laminated substrate 110. That is, the secondary exposing operation S140 includes exposing the second metal layer 113 disposed on the second surface of the base substrate 111.

The secondary exposing operation S140 includes forming the exposure layer 120 on the second surface of the laminated substrate 110. That is, the secondary exposing operation S140 includes laminating a photoresist film on the second surface of the laminated substrate 110 and forming the exposure layer 120 on the surface of the second metal layer 113. The secondary exposing operation S140 may include applying a photoresist onto the second surface of the laminated substrate 110 and forming the exposure layer 120 on the surface of the second metal layer 113.

In the secondary exposing operation S140, UV light is radiated onto the second surface of the laminated substrate 110 through the exposure device in a state in which the antenna pattern 100 is laminated (or disposed) on the second surface of the laminated substrate 110 on which the exposure layer 120 is formed. Accordingly, the exposure layer 120 formed on the second surface of the laminated substrate 110 is cured to the same shape as the antenna pattern 100 of the antenna pattern 100 mask.

The second half groove forming operation S150 includes forming the second half groove 115 in the laminated substrate 110 by etching the second surface of the laminated substrate subjected to the primary exposing operation.

The second half groove forming operation S150 includes forming the second half groove 115 in the laminated substrate 110 by etching the second surface of the laminated substrate.

The second half groove forming operation S150 includes etching the second metal layer 113 on which the exposure layer 120 is formed. The second half groove forming operation S150 includes etching the second metal layer 113 through the etching process such as wet etching or dry etching.

Accordingly, the second half groove 115 recessed from the surface of the second metal layer 113 to the base substrate 111 is formed in the laminated substrate 110. Here, the second half groove 115 may be formed to be recessed from the surface of the second metal layer 113 to the surface of the base substrate 111, and the surface of the base substrate 111 may be exposed through the second half groove 115.

The second half groove forming operation S150 includes removing the cured exposure layer 120 after forming the second half groove 115.

The second half groove forming operation S150 includes forming the second half groove 115 so that at least a part of the second half groove 115 overlaps the first half groove 114. Accordingly, the first half groove 114 and the second half groove 115 form a through hole 116 passing through the laminated substrate 110, and the through hole 116 forms the line spacing of the antenna pattern 100 formed by the laminated substrate 110 (i.e., the first metal layer 112 and the second metal layer 113).

That is, the first metal layer 112 forms a first radiation pattern in a loop shape as the first half groove 114 is formed, and the second metal layer 113 forms a second radiation pattern in a loop shape as the second half groove 115 is formed. The first antenna pattern 100 and the second antenna pattern 100 are connected through one or more via holes formed to pass through the base substrate 111, the first metal layer 112, and the second metal layer 113 to form one antenna pattern 100. In this case, the first half groove 114 and the second half groove 115 form the line spacing of the antenna pattern 100.

Meanwhile, referring to FIGS. 4 and 5, the antenna pattern manufacturing method according to the embodiment of the present disclosure may further include a coverlay sheet 130 laminating operation S135 performed between the first half groove forming operation S130 and the secondary exposing operation S140.

The coverlay sheet 130 laminating operation S135 includes laminating the coverlay sheet 130 on the first surface of the laminated substrate 110 in which the first half groove 114 is formed. The coverlay sheet 130 laminating operation S135 includes laminating the coverlay sheet 130 on the surface of the first metal layer 112 in which the first half groove 114 is formed. In this case, the coverlay sheet 130 is, for example, a sheet formed of a material such as PI, PET, a thermosetting resin, etc.

The coverlay sheet 130 laminating operation S135 is illustrated and described as being performed between the first half groove forming operation S130 and the secondary exposing operation S140, but is not limited thereto, and may be performed after the second half groove forming operation S150.

In addition, the coverlay sheet 130 laminating operation S135 may include laminating the coverlay sheet 130 on the second surface of the laminated substrate 110 (i.e., the surface of the second metal layer 113) or laminating the coverlay sheet 130 on both the first surface and the second surface of the laminated substrate 110.

Referring to FIGS. 6 and 7, the antenna pattern manufacturing method according to the embodiment of the present disclosure may further include a base substrate 111 etching operation S160 of etching a part of the base substrate 111 of the laminated substrate 110.

The base substrate 111 etching operation S160 includes etching a part of the base substrate 111 exposed through the first half groove 114 and/or the second half groove 115. The base substrate 111 etching operation S160 includes, for example, etching a part of the base substrate 111 through a laser etching process, a punching process, or the like.

Accordingly, the first half groove 114 and the second half groove 115 form the through hole 116 passing through the laminated substrate 110, and the through hole 116 forms the line spacing of the antenna pattern 100 formed by the laminated substrate 110 (i.e., the first metal layer 112 and the second metal layer 113).

Meanwhile, the antenna pattern manufacturing method according to the embodiment of the present disclosure may further include a surface treating operation and a stepping operation.

The surface treating operation includes surface-treating the second surface of the laminated substrate 110 on which the coverlay sheet 130 is not laminated. The surface treating operation includes applying an organic material through an organic solderability preservative (OSP) process to form a rust-resisting film on the second surface of the laminated substrate 110. Accordingly, the second surface of the laminated substrate 110 is planarized, and contact between the laminated substrate 110 and air is blocked, thereby preventing oxidation of the second metal layer 113 (i.e., the antenna pattern 100).

In the surface treating operation, to prevent oxidation of the laminated substrate 110 along with the OSP process, a plating layer may be formed by plating the second surface of the laminated substrate 110 with tin (Sn) and nickel (Ni).

The stamping operation includes forming an outline of the antenna pattern 100 on the laminated substrate 110 through a stamping process. The stamping operation includes stamping the laminated substrate 110 through a stamping device and forming the outline of the antenna pattern 100.

Through the above-described process, the antenna pattern manufacturing method according to the embodiment of the present disclosure may manufacture the antenna pattern 100 having a line spacing of 80% or more and 120% or less of the thickness of the laminated substrate 110.

In addition, the antenna pattern 100 manufactured by the antenna pattern manufacturing method according to the embodiment of the present disclosure may operate as a WPC antenna, an NFC antenna, an MST antenna, or the like.

The antenna pattern 100 manufactured by the antenna pattern manufacturing method according to the embodiment of the present disclosure includes one or more through holes 116 interposed between two metal patterns adjacent to the plurality of metal patterns with respect to the vertical cut surface to form the line spacing of the antenna pattern.

With respect to the vertical cut surface of the antenna pattern 100, the metal pattern has the base substrate 111 interposed between two metal layers (i.e., the first metal layer 112 and the second metal layer 113).

With respect to the vertical cut surface of the antenna pattern 100, the through hole 116 includes the first half groove 114 formed by etching the first metal layer 112, the second half groove 115 formed by etching the second metal layer 113, and the base substrate 111 interposed between the first half groove 114 and the second half groove 115. The first half groove 114 and the second half groove 115 overlap at least partially to form the through hole 116 that vertically passes through the antenna pattern. In this case, the through hole 116 may be formed of the first half groove 114 and the second half groove 115 by removing the base substrate 111.

Referring to FIG. 8, a center axis A of the first half groove 114 and a center axis B of the second half groove 115 vertically pass through the first and second surfaces of the laminated substrate 110. When the center axis A and the center axis B are colinearly disposed, the through hole 116 is formed in an "8" shape or a "B" shape that vertically passes through the laminated substrate 110.

However, in an actual process, it is very difficult to accurately align the first half groove 114 with the second half groove 115 (i.e., colinearly arrange the center axis A and the center axis B). Accordingly, referring to FIG. 9, the center axis A of the first half groove 114 and the center axis B of the second half groove 115 are misaligned in a horizontal direction (i.e., a left-right direction in the drawing), and the through hole 116 may be formed in a tilted "8" shape or "B" shape that diagonally passes through the laminated substrate 110.

Referring to FIG. 10, the conventional antenna pattern manufacturing method forms a through hole 16 forming a line spacing of an antenna pattern 100 in a metal sheet 10 through one etching.

A width W1 of the through hole 16 increases in proportion to a thickness T of the metal sheet 10 due to the limitations of the etching technique. Accordingly, a vertical cross section of the antenna pattern 100 (hereinafter, referred to as the conventional antenna pattern 100) manufactured by the conventional antenna pattern manufacturing method has the width W1 (i.e., the line spacing of the antenna pattern 100) of the through hole 16, which is about twice (200%) the thickness T of the metal sheet 10.

For example, when the thickness T of the metal sheet 10 (the antenna pattern 100) is about 2 oz (about 70 μm), the conventional antenna pattern 100 has the width W1 (i.e., the line spacing or line width of the antenna pattern 100) of the through hole 16, which is about 140 μm.

When the thickness T of the metal sheet 10 (the antenna pattern 100) is about 3 oz (about 105 μm), the conventional antenna pattern 100 has the width W1 (i.e., the line spacing or line width of the antenna pattern 100) of the through hole 16, which is about 210 μm.

In contrast, the antenna pattern manufacturing method according to the embodiment of the present disclosure performs the etching process divided into two operations (i.e., the first half groove forming operation S130 and the second half groove forming operation S150) to form the through hole 116.

Accordingly, the vertical cross section of the antenna pattern 100 manufactured by the antenna pattern manufacturing method according to the embodiment of the present disclosure has the width (i.e., the line spacing or line width of the antenna pattern 100) of the through hole 116, which is less than or equal to the thickness of the laminated substrate 110.

In this case, the width of the through hole 116 (i.e., the line spacing or line width of the antenna pattern 100) may be formed to be about 80% to 120% of the thickness of the laminated substrate 110, which includes errors in the manufacturing process.

For example, referring to FIG. 11, when the thickness T of the laminated substrate 110 (i.e., the antenna pattern 100) is about 2 oz (about 70 μm), the antenna pattern 100 manufactured by the antenna pattern manufacturing method according to the embodiment of the present disclosure has a width W2 (i.e., the line spacing or line width of the antenna pattern 100) of the through hole 116, which is about 70 μm.

When the thickness T of the laminated substrate 110 (i.e., the antenna pattern 100) is about 3 oz (about 105 μm), the antenna pattern 100 manufactured by the antenna pattern manufacturing method according to the embodiment of the present disclosure has the width W2 (i.e., the line spacing or line width of the antenna pattern 100) of the through hole 116, which is about 100 μm.

In this way, according to the antenna pattern manufacturing method according to the embodiment of the present disclosure, it is possible to perform the etching process divided into two operations (i.e., the first half groove forming operation S130 and the second half groove forming operation S150), thereby reducing the width of the through hole 116 formed in the laminated substrate 110 (i.e., the line spacing or line width of the antenna pattern 100) by about 50% in comparison to the conventional antenna pattern manufacturing method.

In addition, according to the antenna pattern manufacturing method according to the embodiment of the present disclosure, it is possible to reduce the width of the through hole 116 (i.e., the line spacing or line width of the antenna pattern 100) by about 50% in comparison to the conventional method, thereby manufacturing the antenna pattern 100 having the line spacing (pitch) of 100 μm or less even in the laminated substrate 110 having a thickness of 3 oz (105 μm) or more.

In addition, according to the antenna pattern manufacturing method, it is possible to manufacture the antenna pattern 100 having the line spacing of about 80% to 120% of the thickness of the metal, thereby increasing the degree of freedom of design and enabling the performance optimization design.

In addition, according to the antenna pattern manufacturing method according to the embodiment of the present disclosure, it is possible to manufacture the antenna pattern 100 using the laminated substrate 110 in which the base substrate 111 is interposed between two metal layers, thereby simplifying the manufacturing process and preventing deformation even when the laminated substrate 110 is moved or flipped to manufacture the antenna pattern 100.

The above description is merely the exemplary description of the technical spirit of the present disclosure, and those skilled in the art to which the present disclosure pertains will be able to variously modify and change the present disclosure without departing from the essential characteristics of the present disclosure. Therefore, the embodiments disclosed in the present disclosure are not intended to limit the technical spirit of the present disclosure, but intended to describe the same, and the scope of the technical spirit of the present disclosure is not limited by these embodiments. The scope of the present disclosure should be construed by the appended claims, and all technical ideas within the equivalent scope should be construed as being included in the scope of the present disclosure.

The invention claimed is:

1. An antenna pattern manufacturing method comprising:

preparing a laminated substrate having a base substrate, a first metal layer disposed on a first surface of the base substrate and a second metal layer disposed on a second surface of the base substrate;

exposing the first surface of the laminated substrate;

half-etching the first surface of the laminated substrate to form a first half groove recessed in a direction from the first metal layer toward the base substrate;

exposing the second surface of the laminated substrate; and half-etching the second surface of the laminated substrate to form a second half groove recessed in a direction from the second metal layer toward the base substrate, wherein the forming of the second half groove includes forming the second half groove so that at least a part thereof overlaps the first half groove to form a through hole passing through the laminated substrate, the base substrate is disposed in the through hole, and the through hole forms a line spacing of the antenna pattern.

2. The antenna pattern manufacturing method of claim 1, wherein the line spacing of the antenna pattern is 80% or more and 120% or less of a thickness of the laminated substrate.

3. The antenna pattern manufacturing method of claim 1, wherein the first half groove formed in the forming of the first half groove has a first center axis that vertically passes through the first surface and the second surface of the laminated substrate, the second half groove formed in the forming of the second half groove has a second center axis that vertically passes through the first surface and the second surface of the laminated substrate, and the first center axis and the second center axis are spaced apart from each other.

4. The antenna pattern manufacturing method of claim 1, wherein the first half groove formed in the forming of the first half groove has a first center axis that vertically passes through the first surface and the second surface of the laminated substrate, the second half groove formed in the forming of the second half groove has a second center axis that vertically passes through the first surface and the second surface of the laminated substrate, and the first center axis and the second center axis are disposed colinearly.

5. The antenna pattern manufacturing method of claim 1, further comprising etching the base substrate disposed between the first half groove and the second half groove after the forming of the second half groove.

6. An antenna pattern in a loop shape, wherein a vertical cross section of the antenna pattern includes:

a plurality of metal patterns; and a through hole interposed between adjacent two patterns and formed to form a line spacing of the antenna pattern, and the metal pattern includes:

a base substrate;

a first metal layer disposed on a first surface of the base substrate; and a second metal layer disposed on a second surface of the base substrate, wherein the through hole includes:

a first half groove formed by etching the first metal layer;

a second half groove formed by etching the second metal layer; and the base substrate interposed between the first half groove and the second half groove, and the first half groove and the second half groove at least partially overlap each other to form the through hole that vertically passes through the antenna pattern.

7. The antenna pattern of claim 6, wherein a center axis of the first half groove and a center axis of the second half groove are disposed colinearly.

8. The antenna pattern of claim 7, wherein the through hole has one of an “8” shape and a “B” shape that vertically passes through the antenna pattern.

9. The antenna pattern of claim 8, wherein a center axis of the first half groove and a center axis of the second half groove are disposed in parallel.

10. The antenna pattern of claim 9, wherein the through hole has one of a tilted “8” shape and a tilted “B” shape that diagonally passes through the antenna pattern.

11. The antenna pattern of claim 6, wherein a width of the through hole is 80% or more and 120% or less of a thickness of the antenna pattern.

* * * * *